(12) United States Patent
Challaye

(10) Patent No.: US 8,635,969 B2
(45) Date of Patent: Jan. 28, 2014

(54) DEVICE FOR GUIDING A METAL STRIP IMMERSED IN A LIQUID METAL BATH

(75) Inventor: Alain Challaye, Sorbiers (FR)

(73) Assignee: Siemens VAI Metals Technologies SAS, Saint Chamond (FR)

(*) Notice: Subject to any disclaimer, the term of this patent is extended or adjusted under 35 U.S.C. 154(b) by 806 days.

(21) Appl. No.: 12/441,794

(22) PCT Filed: Sep. 14, 2007

(86) PCT No.: PCT/FR2007/051936
§ 371 (c)(1),
(2), (4) Date: Mar. 18, 2009

(87) PCT Pub. No.: WO2008/034994
PCT Pub. Date: Mar. 27, 2008

(65) Prior Publication Data
US 2010/0064968 A1     Mar. 18, 2010

(30) Foreign Application Priority Data
Sep. 18, 2006   (FR) ...................................... 06 53803

(51) Int. Cl.
*B05C 3/02* (2006.01)
*F16C 19/24* (2006.01)
*D06B 3/00* (2006.01)
*B05D 1/18* (2006.01)

(52) U.S. Cl.
USPC ........... 118/428; 118/400; 118/423; 118/429; 427/430.1; 266/112; 366/331; 384/548; 68/175

(58) Field of Classification Search
USPC ........ 118/428; 427/430.1; 266/112; 366/331; 384/548; 68/175
See application file for complete search history.

(56) References Cited

U.S. PATENT DOCUMENTS

| 3,068,051 | A | * | 12/1962 | Koch | ............................. | 384/484 |
| 3,545,829 | A | * | 12/1970 | Stoll et al. | ..................... | 384/481 |
| 3,675,622 | A | | 7/1972 | Griffin | | |
| 3,951,390 | A | * | 4/1976 | Krause et al. | ................. | 266/221 |
| 3,965,859 | A | * | 6/1976 | Guilbaud | ..................... | 118/428 |
| 5,538,559 | A | * | 7/1996 | Kleimeyer et al. | ........... | 118/423 |
| 5,568,985 | A | * | 10/1996 | Schutte | ........................ | 384/478 |

(Continued)

FOREIGN PATENT DOCUMENTS

| CN | 1639374 A | 7/2005 |
| DE | 10159617 A1 | 6/2003 |

(Continued)

Primary Examiner — Dah-Wei Yuan
Assistant Examiner — Karl Kurple
(74) Attorney, Agent, or Firm — Laurence A. Greenberg; Werner H. Stemer; Ralph E. Locher

(57) ABSTRACT

A device for guiding a strip through a liquid contained in a tank, includes an immersed diverting roller, in particular a roller immersed in a bath of liquid metal such as zinc, mounted rotatably about an axis on two aligned supporting shafts extending through two respective side walls of the tank, and each rotating in a centering bearing positioned outside of the tank. Each bearing of one shaft of the roller includes two rotary supporting members mounted in a fixed housing and spaced apart from each other, namely an outer supporting member and an inner supporting member. The housing of the bearing is held against a support plane formed on the wall and perpendicular to the axis of a hole through which the shaft passes. The wall has measures for centering the housing on the axis.

22 Claims, 2 Drawing Sheets

(56) References Cited

U.S. PATENT DOCUMENTS

| | | | |
|---|---|---|---|
| 5,634,481 A | | 6/1997 | Legoupil |
| 5,954,880 A | * | 9/1999 | Aoki et al. ............... 118/423 |
| 6,261,369 B1 | * | 7/2001 | Morando ................. 118/423 |
| 6,471,394 B2 | * | 10/2002 | Kesig ..................... 366/331 |
| 7,214,272 B2 | | 5/2007 | Hartung et al. |
| 2004/0175067 A1 | * | 9/2004 | Loth ...................... 384/548 |
| 2007/0172598 A1 | * | 7/2007 | Brisberger et al. ........ 427/430.1 |
| 2009/0272319 A1 | * | 11/2009 | Behrens et al. ........... 118/623 |
| 2009/0290270 A1 | * | 11/2009 | Ganev et al. ............. 361/21 |
| 2010/0285239 A1 | * | 11/2010 | Behrens et al. ........... 427/595 |

FOREIGN PATENT DOCUMENTS

| | | |
|---|---|---|
| FR | 1580081 A | 8/1969 |
| FR | 2721235 A1 | 12/1995 |
| FR | 2735499 A1 | 12/1996 |
| GB | 188442 A | 11/1922 |
| JP | 03024254 A | 2/1991 |
| JP | 04346641 A | 12/1992 |
| JP | 07138722 A | 5/1995 |
| JP | 10251819 A | 9/1998 |
| JP | 2000120713 A | 4/2000 |
| WO | 03072843 A1 | 9/2003 |

* cited by examiner

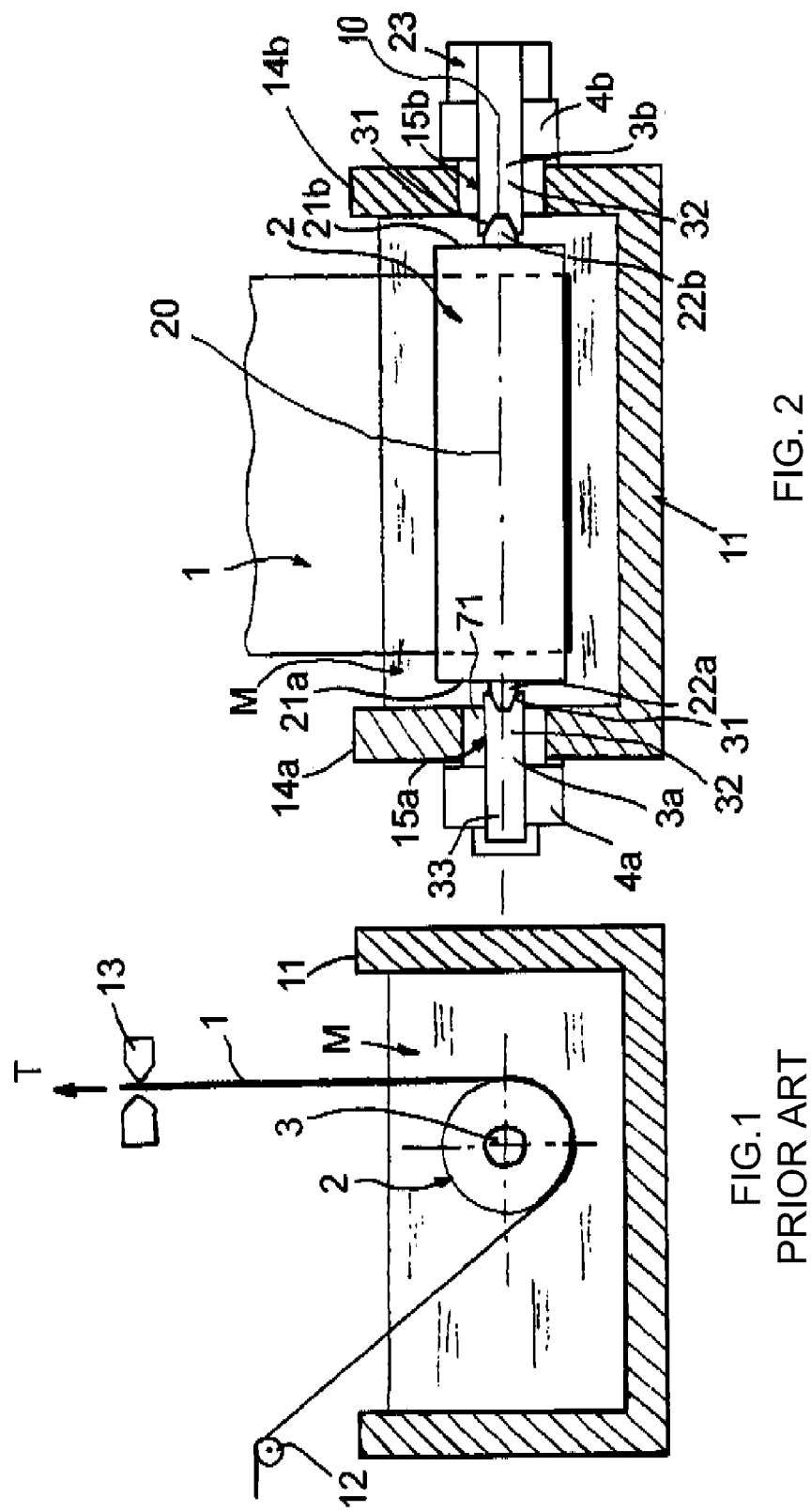

DEVICE FOR GUIDING A METAL STRIP IMMERSED IN A LIQUID METAL BATH

BACKGROUND OF THE INVENTION

Field of the Invention:

The invention relates to a device for guiding a strip in a liquid bath and is especially well suited for the continuous coating of a metal strip by hot dipping in a dip tank containing a bath of molten metal.

Processes of continuous lining of metal strips by going through a bath of molten metal have been known for a long time. For example, the strip which is coming as a spool can be unwound and subjected, in a continuous line, to a pickling then to an annealing under neutral atmosphere, in a heater at the exit of which the strip is immersed in a dip tank full of liquid metal, such as zinc or a zinc-aluminium alloy. To do that, the strip has to run on two successive diverting rollers, respectively an upper roller which diverts it downwards and a roller immersed in the bath of metal from which the strip goes back up and out of the bath according to a rather vertical direction, and then is conducted towards mangling and cooling devices. The strip, then, can be subjected to various finish treatments like a skin-pass and chemical treatments of surface before being spooled again.

Because of the rather high travelling speed of the strip, the diverting roller immersed in the bath is spinning at a rather high speed and, moreover, has to withstand the tension of the strip. Therefore it is supported by bearings that are subjected to important stresses and the life span of which is fairly limited. These bearings can be immersed in the bath or placed outside of it.

In the simplest assembly that is described, for example, in document FR-A-2735499, the diverting roller is supported by two bearings which are mounted on two aligned fixed trunnions supported by two vertical arms going into the bath. To improve the strength of the bearings immersed this way, their components can be made of ceramic or, for example, of a cobalt-based alloy. Such an assembly is interesting because of the great facility of removal of the roller but the life span of the bearings remains limited. Moreover, the insertion into the bath of the bearings and of the support arms requires a wider dip tank and therefore an increase of the volume of liquid metal.

Another possibility consists in mounting the bearings on the sidewalls of the dip tank which therefore must be equipped with sealing gaskets to avoid or, at least, to limit the leakages of liquid metal the pressure of which, at gasket level, can be rather important considering the metal density and the immersion depth of the roller.

For example, document JP-A-4346641 describes a gasket inside which a linear engine built in the wall determines an electromagnetic force of return of the metal towards the inside of the bath. However, the two axes of the roller which are extending between each end of it and the corresponding bearing necessarily have a certain length and therefore are subjected, because of the tension exerted on the strip, to transverse stresses which cause an off-centering of the roller axis regarding the hole of crossing in the sidewall and, thus, a risk of damage of the gaskets and of increase of metal leakages. This is why, in another assembly described in document FR-A-2 721 235 and concerning a dip tank of acid pickling of a metal strip, each axis of the roller crosses the sidewall of the dip tank and is supported by a bearing mounted on a second wall in spaced relation with the sidewall, said space wherein the possible leakages of liquid are collected. Document JP-A-10251819 describes a similar assembly for a galvanizing device and considers the heating of the liquid collected in the spout, to send it back in the bath. Such assemblies complicate the setting and, furthermore, increase again the distance between the bearing and the wall of the dip tank and, as a consequence, the length of the axis and the risks of its off-centering because of the transverse stresses exerted by the tension of the strip. Besides, if the roller has to be removed for maintenance or replacement, the hole of crossing of the axis is widely open and the dip tank has therefore to be drained beforehand.

Now, despite the fact the use of new materials may improve performance of the immersed rollers, these have still to be removed quite often and the outcome is a break of the running that decrease the plant productivity.

BRIEF SUMMARY OF THE INVENTION The invention brings a solution to such problems thanks to a new assembly of the support bearings of the axes of an immersed roller enabling, in particular, to ensure an excellent centering of the roller and, as a consequence, to decrease the risks of leakages. Furthermore, thanks to the invention, the operations of removal and of reassembly of the roller are much simpler than in the known assemblies and do not require a drain of the dip tank beforehand.

On another hand, the invention is designed especially for the coating of a strip with a liquid metal but could also be used each time a roller is immersed in a corrosive liquid or fluid, for example an acid or an electrolyte. Therefore the invention concerns, generally speaking, a device for guiding a strip in a bath of liquid contained in a dip tank, comprising a diverting roller immersed in the dip tank between two sidewalls of it and journalled for rotation around an axis in two aligned bearing shafts respectively crossing the two sidewalls of the dip tank, perpendicularly to said sidewalls, by passing through a hole of the wall and extending up to a support part rotating in a centering bearing placed outside the dip tank. According to the invention, each bearing of a shaft of the roller comprises at least two rotating support components mounted in a fixed housing and separated from each other in order to withstand transverse stresses exerted on the roller, respectively an external support component and an internal support component placed the closest as possible to the wall, the housing of the bearing being placed on a support plane surrounding the hole of crossing of the shaft and perpendicular to the axis of the hole, along an external side of the sidewall of the dip tank, said sidewall being supplied with means of centering of the housing around the axis of the hole of crossing of the shaft of the roller.

In a particularly advantageous fashion, each bearing shaft of the roller comprises an external part extending between two rotating support components, in spaced relation, of the bearing and an internal part crossing the sidewall of the dip tank and inserted with a small play inside a cylindrical opening built in the sidewall and delimiting the hole of crossing of the shaft.

This cylindrical opening extends on a length sufficient to place along said opening at least tightness means by production of a reverse flow towards the inside of the dip tank of the metal seeping in the annular space between the bearing shaft of the roller and the internal side of the cylindrical opening.

Various means can be used, separately or as a combination, to ensure this tightness.

For example, at least one helical groove can be designed along the internal part of the shaft inserted in the cylindrical opening.

Advantageously, the device comprises means of insertion of a fluid under pressure in the annular space resulting from the play between the internal part of the shaft and the cylindrical opening limiting the hole of crossing of the shaft, for the upholding of the tightness with leakage losses of the fluid at least towards the inside of the dip tank.

But, if the roller is immersed in a bath of liquid metal such as zinc, the sidewall of the dip tank can comprise at least induction means producing, around the cylindrical opening of crossing of the shaft, a magnetic field capable of determining a return towards the inside of the dip tank, of the metal infiltrated in the annular space between the shaft and the opening.

In case the sidewall of the dip tank is lined internally with a refractory coating, each shaft of the roller passes with a small rotation play through a hole of the sidewall and is extended up to an end side of the roller by an internal part inserted with a small play inside a cylindrical opening made through the whole thickness of the refractory coating of the wall.

According to another characteristic particularly advantageous, at least one of the two bearing shafts of the roller is fixed in a removable fashion, by an internal end, on a corresponding end side of the roller and is mounted for sliding axially in the cylindrical opening between a tightened position of bearing of the roller and a loosened position of removal of the roller. Preferably, the internal end of the shaft tightens in a removable fashion, by axial sliding, on a centering component built on the corresponding end side of the roller. To that purpose, the internal end of the shaft and the centering component of the roller can be supplied with complementary parts made respectively hollow and protruding in order to fit into one another by axial sliding.

Thus, for the removal of the roller, it is sufficient to laterally move apart the two bearing shafts which are remaining inserted in the holes crossing the walls and the openings that are extending them and it is not necessary to drain the dip tank, tightness remaining ensured. Advantageously, after the engagement of the internal end of the shaft on the centering component of the roller, said roller can be driven in rotation by means of exertion of a rotation torque on the external part of the shaft.

Preferably, the internal part of the shaft is coated on its outside with a material standing up to wear and/or to corrosion from the liquid contained in the dip tank, such as a ceramic material. In a preferred embodiment of the invention, the internal part of the shaft that is crossing the wall of the dip tank forms a centering pin mounted for sliding axially in a tightness piece shaped like a hollow socket having a cylindrical external side inserted with a small play inside the cylindrical opening of the sidewall and emerging inside the dip tank from an internal end sealed by a bottom supplied with a part engaging in a removable fashion on a centering component of the end side of the roller. In case of removal of the bearing and of the shaft, this socket can remain inserted inside the cylindrical opening of the sidewall in order to maintain tightness. Advantageously, the shaft is subjected, in use, to an axial load directed towards the inside and is leaning on the socket by means of a shoulder on the socket, for the engagement of the internal end of said socket on the centering component of the roller.

Preferably, the tightness socket is made or, at least, coated on its outside of a material standing up to wear and/or to corrosion from the liquid contained in the dip tank, a ceramic for example and the cylindrical opening of crossing of the internal part of the shaft is built in a ring made of refractory material.

According to another characteristic particularly advantageous, the housing of the bearing is placed on a rigid fixture integrated into the sidewall of the dip tank and defining the support plane orthogonal to the axis of the hole of crossing of the shaft.

Preferably, the housing of the bearing forms, at its end facing the dip tank, a cylindrical head centred around the axis of the hole of crossing of the shaft and axially inserting itself in an internal boring of an edge of the support fixture surrounding the crossing hole and having a plane side perpendicular to said axis upon which is placed a plain clamp set around the head of the housing, said plane side defining the support plane.

According to another preferred characteristic, the housing of the bearing is fixed on the support fixture by elastic means enabling to exert an axial thrust stress capable of absorbing possible thermal stress. On another hand, in a preferred embodiment of the invention, the two rotating components of support of the external part of the shaft are mounted inside an external cage forming a cartridge inserted in an axial boring of the housing of the bearing and capable of being removed from the housing with the bearing by axial sliding while letting the housing fixed on the centering fixture. Furthermore, the centering of the shaft can be tuned by insertion of thin pieces of adaptable thickness between the cartridge bearing the shaft and a boring of the housing in which it is inserted.

BRIEF DESCRIPTION OF THE SEVERAL VIEWS OF THE DRAWING.

Other advantageous characteristics of the invention will show in the following description of a particular embodiment, given as an example by reference to the annexed drawings.

FIG. 1 is a schematic view, in cross-section, of a device for coating a strip by immersion in a dip tank.

FIG. 2 is a schematic view, in axial section, of the roller.

DESCRIPTION OF THE INVENTION

Figure 3:
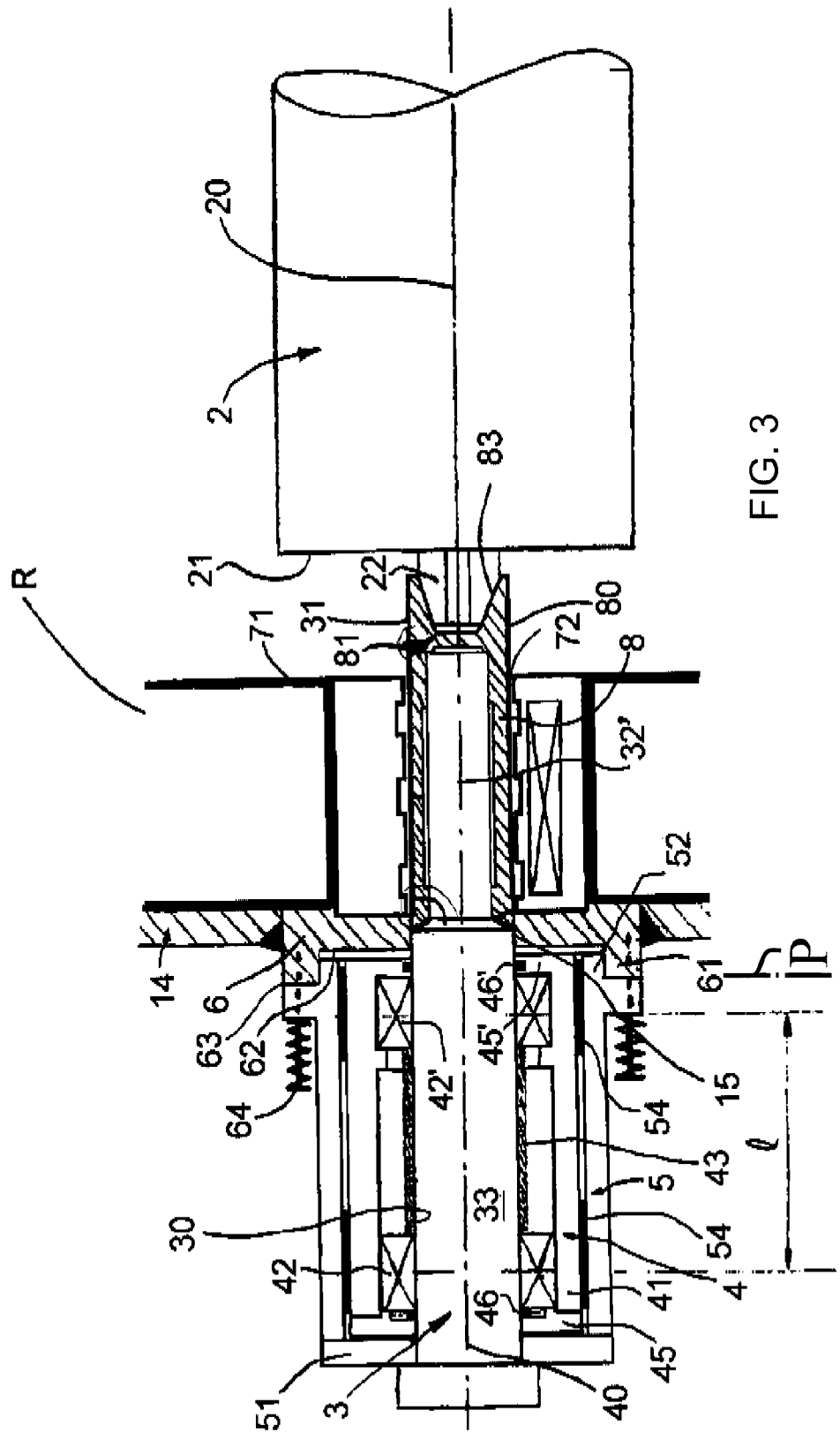
FIG. 3 is a schematic view, in axial section, of a centering bearing of the roller.

FIG. 1 schematically shows, in cross-section, a device for coating a metal strip 1 by immersion in a bath M of liquid metal filling a dip tank 11 wherein is immersed a diverting roller 2. The strip 1 driven by means not represented of control of the travel according a longitudinal direction parallel to the plane of FIG. 1, is diverted downwards by an upper diverting roller 12 and winds round a sector of the immersed roller 2 in order to go out of the bath M according to an ascending direction rather vertical. The strip 1 is thus coated, on its two sides, with a layer of liquid metal which thickness is controlled by a device 13, with an air knife for example.

As shown in FIG. 2 which is a schematic view in axial section, the diverting roller 2 is mounted for rotation on two aligned shafts 3a, 3b, centred around the axis 20 of the roller and each rotating in a bearing 4a, 4b.

As indicated above, these two bearings 4a, 4b are placed outside the dip tank 11. Each of the two shafts 3a, 3b therefore comprises an external part 33 rotating in the bearing 4a, 4b and an internal part 32 that is crossing the corresponding sidewall 14a, 14b of the dip tank 11 by passing through a hole 15a, 15b, centred around an axis 10.

To allow the removal of the roller 2, said roller is linked in a removable fashion to the internal ends 31 of the two shafts 3a, 3b. To that purpose, the roller 2 can advantageously be supplied, at the centre of each of its end sides 21a, 21b, with a trunnion 22a, 22b centred around the axis 20 of the roller and forming a protruding piece that fits into a hollow part, of complementary shape, designed on the end 31 of the corresponding shaft 3a, 3b.

Moreover, at least one of the two shafts 3a, 3b is mounted for axial sliding in order to be capable of being moved apart laterally the distance necessary to free the roller 2 so as to remove it from the bath M.

As indicated above, the strip 1 is subjected to a pull strain and is resting upwards on the roller 2 by exerting transverse stresses on the ends 31 of the two shafts 3a, 3b which are supported by the bearings 4a, 4b.

According to one of the characteristics of the invention, these bearings 4a, 4b are placed straight on the external sides 16 of the sidewalls 14 of the dip tank 1 in order to reduce as much as possible the length of the internal part 32 of the shaft 3 extending with a overhang between the end side 21 of the roller 2 and a support plane P of the bearing 4 orthogonal to the axis 10 of the hole of crossing 15. This way, the risk of off-centering of the bearing shaft 3 regarding the hole 15 of crossing in the sidewall 14 of the dip tank 11 is decreased, its external part 33 being maintained embedded in the bearing 4 placed on the wall 14 and its internal part 32 capable of passing with a small play through a radial shaft seal 71 surrounding the hole of crossing 15.

In a preferred embodiment of the invention described in detail on FIG. 3, each bearing 4 comprises, inside a housing 5, two rotating support components, normally tapered roller bearings 42, 42' which are a distance 1 apart in order to realize a real embedding of the external part 33 of the shaft 3 inserted in the roller bearings 42, 42' enabling to withstand the transverse stresses exerted on the roller 2 by the tension of the strip 1. A tubular spacer 43 enables to maintain the gap between the two separated roller bearings 42, 42'. Preferably, the assembly is housed in a cylindrical piece forming a cartridge 41 closed by two bottoms 45, 45' and that is inserted in a housing 5, said housing being closed in a removable manner by a cover 51. It is thus possible, after removal of the cover 51, to make slide the assembly of the shaft 3 and of the cartridge 41 forming the bearing 4, in the housing 5 which remains fixed on the sidewall 14 of the dip tank 1, in order to free the trunnion 22 so as to allow the removal of the roller 2. Besides, in order to ensure the centering of the axis 40 of the bearing 4 and of the bearing shaft 3 around the axis 10 of the hole 15 of crossing of the bearing shaft 3 through the wall 14, the housing 5 is placed on a rigid fixture 6 welded on the wall 14 and surrounding the hole of crossing 15, in order to define a support plane P perpendicu- lar to the axis 10 of the hole around which is centred the axis 20 of the roller. To this purpose, the fixture 6 comprises an edge 61 with a one-eyed boring 62 perfectly centred around the axis 10 and wherein a head 52 is inserting itself, said head designed at the end of the housing 5 facing the wall 14, in front of a widened part forming a plain clamp that closes in to rest upon an annular side 63 of the fixture 6 defining the support plane P perpendicular to the axis 10, in a position for which the ends 31 of the two shafts 3a, 3b engage on the centering trunnions 22a, 22b of the roller 2. Preferably, the housing 5 wherein is placed the assembly of the bearing 4 and of the shaft 3 is fixed against the support side 63 of the fixture 6 by pressing elastic components, for example springs associated to bolts, that insert themselves in threaded borings designed on the edge 61 of the fixture 6, in order to make the plain clamp rest on the support side 63.

Those pressure means 64 exert, through the bearing 4 and the axis 3, opposite axial loads on both trunnions 22a, 22b of the roller 2 that ensure the support of said roller by resisting to the transverse stresses resulting of the pull strain exerted on the strip 1, and by absorbing the differential thermal stresses caused by the heat of the bath M.

On another hand, thin levelling pads 54 inserted between the cartridge 41 and the housing 5 enable to tune with precision the concentricity between the axis 40 of the bearing 4 inserted in the housing 5 and the axis 10 of the boring 62 of the fixture 6. Because of this perfect concentricity obtained thanks to the centering of the head 52 in the boring 62 of the fixture 6, it is possible to leave only a small play between the external side 30 of the shaft 3 and the internal side of the hole of crossing 15, this small play being just sufficient to allow the high-speed rotation of the shaft 3 around its axis 40 which is perfectly aligned with the axis 10 of the hole 15.

Besides, the two bottoms 45, 45' of the cartridge 41 are supplied with annular gaskets 45, 45' enabling the rotation of the shaft while ensuring the tightness of the bearing the lubrication and the cooling of which are ensured by circuits designed, in a classical fashion, in the cartridge 41 and conveying a lubrication fluid and a cooling liquid or gas. According to another characteristic of the invention, the upholding of the tightness between the bearing shaft 3 and the sidewall 14 of the dip tank 1 is ensured along a cylindrical opening designed inside a radial shaft seal 71 and extending on a length sufficient to place on it tightness means sending back towards the inside of the dip tank the metal infiltrated in the annular space 72 between the shaft 3 and the opening. It is necessary, indeed, in order to enable the rotation of the bearing shaft 3 with the roller 2, to leave a minimum play between the external side of the shaft 3 and the internal side of the cylindrical opening. The liquid metal M can thus go into this annular space 72, possibly up to the gasket 46' between the external cage 41 of the bearing 4 and the shaft 3. As indicated above, the shaft 3 therefore comprises an external part 33 maintained in the bearing 4 and an internal part 32 which extends along the opening up to its end 31 of centering of the trunnion 22 of the roller 2. However, because of the perfect centering realized according to the invention and due to the fact that the risks of bending are limited by the embedding of the external part 33 of the shaft in the bearing 4 kept placed, along the plane P, on the sidewall 14 of the dip tank, the thickness of the play 72 can be limited. Moreover, various tightness means not opposing to the rotation of the shaft 3 can be used to prevent metal leakages. For example, the external surface of the part 32 of the bearing shaft 3 extending in the opening can be supplied with a helical groove determining, under the action of the rotation of the shaft 3 and of the socket 8, the holding back and the sending back, towards the inside, of the metal capable of seeping in the annular space 72. It is preferable, however, in order to ensure an excellent tightness, to design on the internal side of the opening, annular channels 73 fed by a compressed gas, advantageously a neutral gas such as nitrogen, in order to create a kind of fluid bearing along the opening between the shaft 8 and the wall 14 of the dip tank 11, the gas being injected under a pressure slightly greater than the one of the bath of liquid metal M, according to the immersion depth and to the metal density, so as to produce slight leakage losses of gas towards the inside of the dip tank. Zone Name: B23,AMD Besides, the sidewall 14 of the dip tank 11 is generally lined with a refractory coating R in the thickness of which can be designed the opening. In the preferred embodiment of the invention represented on FIG. 3, this cylindrical opening is built in a ring 71, made of refractory material, which is fitted into a spot facing designed on the internal side of the fixture 6 and extends on the whole thickness of the refractory material R. However, all risks of contact between the internal part 32 of the shaft and the refractory ring 71 cannot always been avoided. Advantageously, this part 32 of the shaft 3 can be coated with a ceramic material standing up to wear. Nevertheless, in the preferred embodiment of the invention represented on FIG. 3, this internal part 32 of the shaft 3 presents a reduced diameter and forms a centering pin on which is slipped on, with a simple play of sliding, a tightness tubular piece 8 in the shape of a hollow socket having a cylindrical external side 80 passing with a small play 72, through the opening of the refractory ring 71 and which is closed by a bottom 81 forming the internal end 31 of the shaft 3. The opposite end of the socket 8 forms an annular support side on a shoulder 35 of the shaft 3 limiting the external part 33 of said shaft at fixture 6 level, the external side 80 of the socket 8 having the same diameter as the external side 30 of the external part 33 of the shaft 3, in order to form a continuous side. The bottom 81 of closing of the socket 8 forms a female cone 83 wherein is engaging a male cone of complementary profile designed on the trunnion 22 of centering of the roller 2. The shaft 3 is mounted axially fixed in the housing 5 in such a way that, when said housing is placed by the pressing elastic components 64 against the fixture 6, the two sockets 8 associated to the two shafts 3a, 3b and pushed away by the shoulders 35 exert opposite axial loads on the two trunnions 22a, 22b of the roller 2 which thus is locked by friction with the two shafts 3a, 3b that, thanks to the assemblies that have just been described, are perfectly centred around the axes 10 of the two holes 15a, 15b and aligned with the axis 20 of the roller. The roller can be mounted wild on its two bearings 4a, 4b but it can also be driven in rotation around its axis, to control the travel of the strip, by means of a motorization device 23 set for rotation on one of the shafts 3b of the roller. Additional means can be used to ensure the tightness along the opening.

Besides, it is possible to place inside the ring 71 made of refractory material, inductors 74 generating static or sliding magnetic fields that can add their effect or replace the gas under pressure in order to ensure the tightness of the dip tank 11 at hole level. Note must be taken that these inductors 74 can also be used to heat the refractory ring 71 around the opening in order to maintain at its fusion temperature the liquid metal capable of seeping in the annular space 72 and to help it going back towards the inside of the dip tank.

Possibly other inductors can also be installed in the refractory coating R of the sidewall 14 of the dip tank 11 in order to heat the whole device. However, during the operation of replacement of the roller, it can be advantageous to let solidify the metal capable of seeping in the annular space, which enables to ensure a complete tightness. After reassembly of the roller aligned with the axis of the bearing shafts 3a, 3b, the ring 71 can be heated by means of the inductors 74 in order to set the metal back to its liquid state so as to allow again the bringing closer to one another of the two shafts and the engagement of their ends 31 on the trunnions 22a, 22b of the roller 2.

Of course, the invention is not limiting itself to the details of the embodiment that has just been described as a simple example and on the contrary covers all the variant versions using equivalent means.

In particular, the coupling between the internal end of each bearing shafts 3 and the corresponding end 21 of the roller 2 could be realized another way, for example by designing at the end 31 of the bearing shaft 3, a male conical part fitting into a cup of complementary profile, designed on the end side 21 of the roller 2. On the other hand, it is sufficient, so as to remove the roller 2, to move slightly apart the two shafts 3a, 3b but the assemblies that have just been described also enable, if necessary, to remove each shaft 3a, 3b with its bearing 4a, 4b, for maintenance or replacement purposes.

Such an operation being less common than the simple replacement of the roller, it is possible, in that case, to drain the dip tank 11, at least up to holes 15 level. However, in the embodiment of FIG. 3, the tightness socket 8 could be mounted in a removable fashion on the pin 32' and stay inserted in the opening after removal of the shaft 3, in order to ensure tightness. It would not then be necessary to drain the dip tank for the replacement of the bearings.

Besides, the invention has been described in the case of a device for coating but could also find an application each time a roller has to be kept immersed into a liquid or a corrosive fluid and it is interesting as a result to place the bearings of the roller outside the dip tank, while ensuring sufficient tightness. For example, such assemblies could be used for the keeping of a diverting roller into a dip tank of acid in a plant of acid pickling of metal strips. In that case, the use of a tightness socket made in a ceramic material would enable to better stand up to corrosion from the acid. Moreover, the sides of the dip tank are generally lined with a refractory coating. It is then possible to design the opening of crossing of the shaft 3 in the way described above and represented on FIG. 3.

In the cases, however where this refractory coating would not be necessary, the wall of the dip tank being made of a simple sheet iron, the cylindrical opening could be built in a tubular piece extending towards the inside, as an extension of the hole of crossing of the shaft, and having a sufficient length to ensure the tightness.

The invention claimed is:

1. A device for guiding a metal strip immersed in a liquid metal bath, the device comprising:
    a dip tank containing the liquid metal bath and having sidewalls, two of said sidewalls each having a respective hole formed therein defining a hole axis;
    a diverting roller immersed in said dip tank between said two sidewalls;
    centering bearings disposed outside said dip tank;
    support parts each rotating in a respective one of said centering bearings;
    two aligned bearing shafts each passing through a respective one of said holes in said sidewalls perpendicular to a respective one of said two sidewalls up to a respective one of said support parts for journaling said diverting roller for rotation around a roller axis, each of said support parts having a portion inserted, with only a small play, in a cylindrical opening formed in a respective one of said sidewalls;
    a fixed housing disposed on a support plane surrounding one of said holes for said bearing shafts perpendicular to said hole axis, along an outer surface of one of said sidewalls of said dip tank;
    bearings each associated with a respective one of said bearing shafts, said bearings each including at least two rotating support components mounted and spaced apart in said fixed housing for withstanding transverse stresses exerted on said roller, said support components including an outer support component and an inner support component; and
    a device disposed at said one sidewall for centering said housing around said hole axis.

2. The guiding device according to claim 1, wherein said support parts for each of said bearing shafts of said roller include an external part extending between said rotating support components of said centering bearings and an internal part each crossing a respective one of said sidewalls of said dip tank and inserted with only a small play in a cylindrical opening formed in a respective one of said sidewalls and delimiting a respective one of said holes for said bearing shafts.

3. The guiding device according to claim 2, wherein said roller has end sides, at least one of said two bearing shafts of said roller has an internal end removably fixed on a corresponding one of said end sides of said roller and mounted for sliding axially in said cylindrical opening between a fastened bearing position of said roller and a loosened removal position of said roller.

4. The guiding device according to claim 3, wherein said end sides of said roller have centering components, and each of said internal ends of said shafts engages removably by axial sliding on a respective one of said centering components.

5. The guiding device according to claim 4, wherein said internal ends of said shafts and said centering components of said roller have complementary hollow protruding parts fitting into one another by axial sliding.

6. The guiding device according to claim 4, which further comprises a device for exerting a rotational torque on said external part of one of said two shafts for rotational drive of said roller after engagement of said internal end of said shaft on said centering component of said roller.

7. The guiding device according to claim 2, wherein said internal part of said shaft has an outside coated with a material or a ceramic material resisting at least one of wear or corrosion from the liquid contained in said dip tank.

8. The guiding device according to claim 4, which further comprises a tightening piece shaped as a hollow tightening socket having a cylindrical external side inserted with only a small play in said cylindrical opening in said sidewall and emerging inside said dip tank from an internal end sealed by a bottom having a part engaging removably on one of said centering components of said end sides of said the roller, said socket remaining inserted in said cylindrical opening in said sidewall upon removal of said shaft, to preserve tightness, and said internal part of said shaft forming a centering pin mounted for axial sliding in said tightening socket.

9. The guiding device according to claim 8, wherein, during use, said shaft is subjected to an inwardly-directed axial load and rests on said socket for engagement of an internal end of said socket on said centering component of said roller.

10. The guiding device according to claim 8, wherein said tightening socket is formed of a material or a ceramic material resisting at least one of wear or corrosion from the liquid contained in said dip tank.

11. The guiding device according to claim 2, wherein said cylindrical opening for said bearing shaft is a ring formed of refractory material.

12. The guiding device according to claim 2, which further comprises a device for tightening against seepage of the metal by producing a reverse flow towards an interior of said dip tank in a space between said shaft and a side of said cylindrical opening, said cylindrical opening for said shaft being extended by a length sufficient to at least place said tightening device along said opening.

13. The guiding device according to claim 12, wherein said tightening device is configured as at least one helical groove formed along said internal part of said shaft inserted in said cylindrical opening.

14. The guiding device according to claim 12, which further comprises a device for inserting a fluid under pressure in an annular space resulting from play between said internal part of said shaft and said cylindrical opening limiting said hole for said bearing shaft, to maintain tightness against leakage losses of the fluid at least towards said interior of said dip tank.

15. The guiding device according to claim 12, wherein the liquid metal in which said roller is immersed is zinc, and said sidewall of said dip tank includes at least an induction device for producing a magnetic field around said cylindrical opening for said shaft causing a movement towards said dip tank of the metal infiltrating an annular space between said internal part of said shaft and said cylindrical opening.

16. The guiding device according to claim 1, wherein said roller has end sides, each of said sidewalls of said dip tank is lined internally with a refractory coating having a thickness, and each of said shafts for said roller passes, with only a small play, enabling rotation of said shaft, through said hole in a respective one of said sidewalls and has an internal part extended to one of said end sides of said roller and inserted with only a small play in a cylindrical opening formed entirely through said thickness of said refractory coating of said sidewall.

17. The guiding device according to claim 1, which further comprises a rigid fixture integrated into one of said sidewalls of said dip tank and defining said support plane orthogonal to said axis of said hole for said shaft, said housing for said centering bearings being disposed on said rigid fixture.

18. The guiding device according to claim 17, wherein said rigid fixture has an edge with an internal bore formed therein surrounding said hole and a plane side disposed perpendicular to said axis of said hole and defining said support plane, and said housing for said centering bearings includes an end facing said dip tank having a cylindrical head centered around said axis of said hole for said bearing shaft and axially inserted in said internal bore with a clamp disposed around said head of said housing and resting upon said plane side.

19. The guiding device according to claim 17, which further comprises a resilient device fixing said housing for said centering bearings on said support fixture for exerting a controlled axial thrust stress capable of absorbing possible thermal stress.

20. The guiding device according to claim 1, which further comprises an external cage forming a cartridge inserted in an axial bore in said housing for said centering bearings, said cartridge being removable from said housing for said centering bearings by axial sliding, and said at least two rotating support components for said external part of said shaft being mounted inside said external cage.

21. The guiding device according to claim 20, which further comprises thin pieces with adaptable thickness inserted between said cartridge for said shaft and said bore in said housing receiving said cartridge, for adjustably centering said shaft.

22. A device for guiding a metal strip immersed in a liquid metal bath, the device comprising:
   a dip tank containing the liquid metal bath and having sidewalls, two of said sidewalls each having a respective hole formed therein defining a hole axis;
   a diverting roller immersed in said dip tank between said two sidewalls and configured to contact the metal strip;
   centering bearings disposed outside said dip tank;
   support parts each rotating in a respective one of said centering bearings;
   two aligned bearing shafts each passing through a respective one of said holes in said sidewalls perpendicular to a respective one of said two sidewalls up to a respective one of said support parts for journaling said diverting roller for rotation around a roller axis;
   a fixed housing disposed on a support plane surrounding one of said holes for said bearing shafts perpendicular to said hole axis, along an outer surface of one of said sidewalls of said dip tank;

bearings each associated with a respective one of said bearing shafts, said bearings each including at least two rotating support components mounted and spaced apart in said fixed housing for withstanding transverse stresses exerted on said roller resulting from a pull strain exerted on the metal strip, said support components including an outer support component and an inner support component;

a device disposed at said one sidewall for centering said housing around said hole axis; and said support parts for each of said bearing shafts of said roller include an external part extending between said rotating support components of said centering bearings and an internal part each crossing a respective one of said sidewalls of said dip tank and inserted with only a small play in a cylindrical opening formed in a respective one of said sidewalls and delimiting a respective one of said holes for said bearing shafts.

\* \* \* \* \*